INVENTOR.
Michael F. Najmowski,
BY
Gehr + Leonard,
his ATTORNEYS.

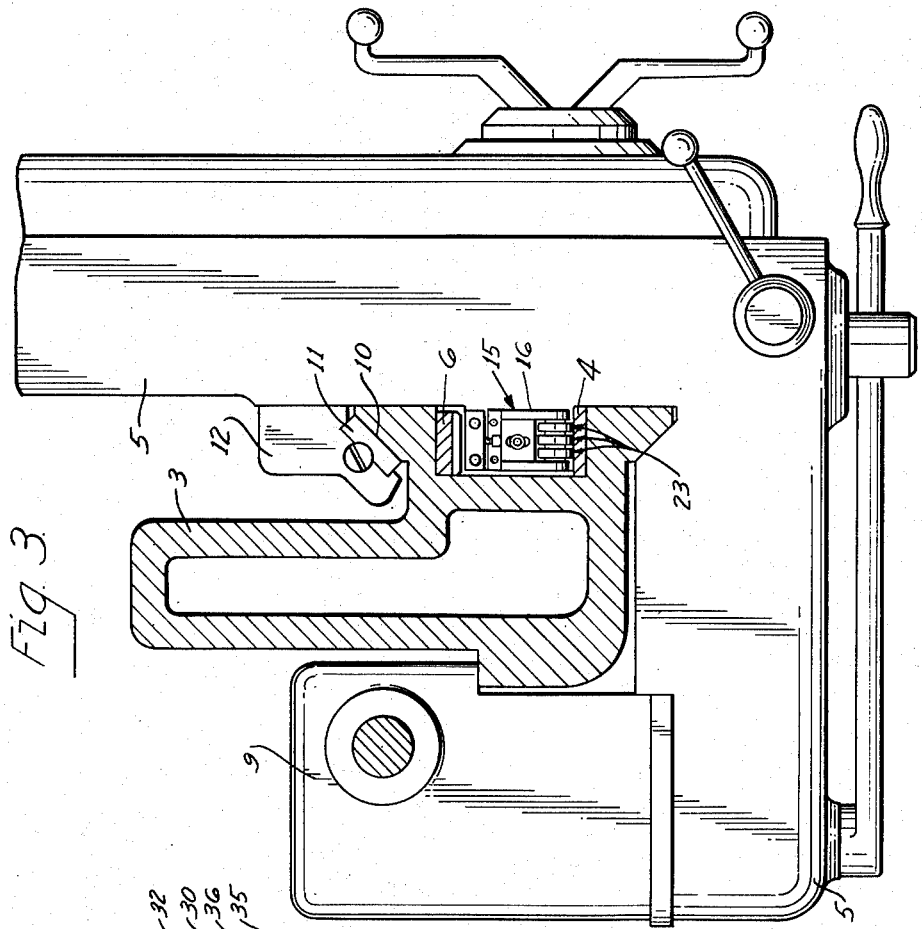
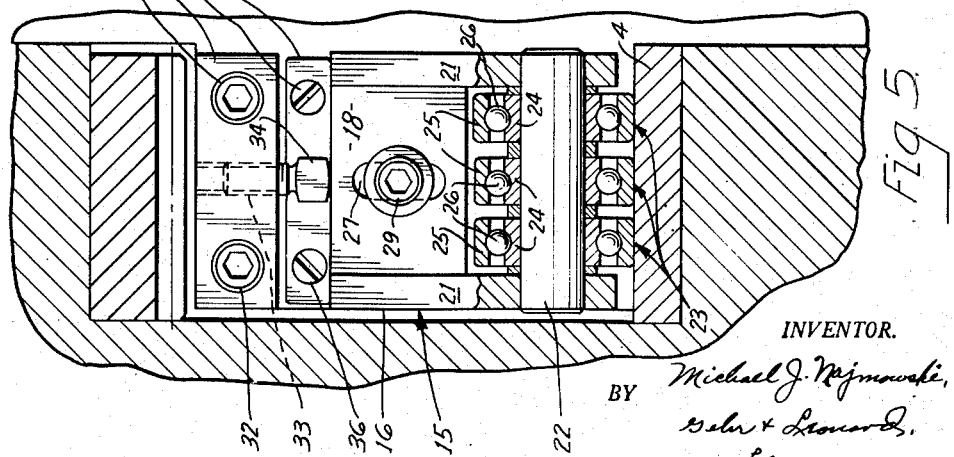

United States Patent Office 2,801,888
Patented Aug. 6, 1957

2,801,888

ANTIFRICTION DEVICE FOR TOOL CARRIAGE OF METAL WORKING MACHINE

Michael F. Najmowski, Brunswick, Ohio

Application May 14, 1956, Serial No. 584,621

6 Claims. (Cl. 308—6)

This invention relates to metal working machines of the type in which a movable tool carriage is supported on a generally horizontal slideway for adjustment to different positions therealong, and particularly to an antifriction device which may be readily attached to the carriage of such a machine and adjusted so as to lift the carriage from sliding engagement with the slideway and to support the carriage antifrictionally on the slideway for movement of the carriage therealong.

For the purposes of illustration the invention is disclosed herein in connection with a radial drill press of the "Carlton" type for which it is particularly adapted, its use in connection with other tools being readily apparent from the illustrative example.

Various objects and advantages will become apparent from the following description wherein reference is made to the drawings, in which:

Fig. 3 is a vertical sectional view taken on the line 3—3 of Fig. 2;

Fig. 5 is an enlarged left end elevation, partly in section, of the structure illustrated in Fig. 4.

Figure 1:
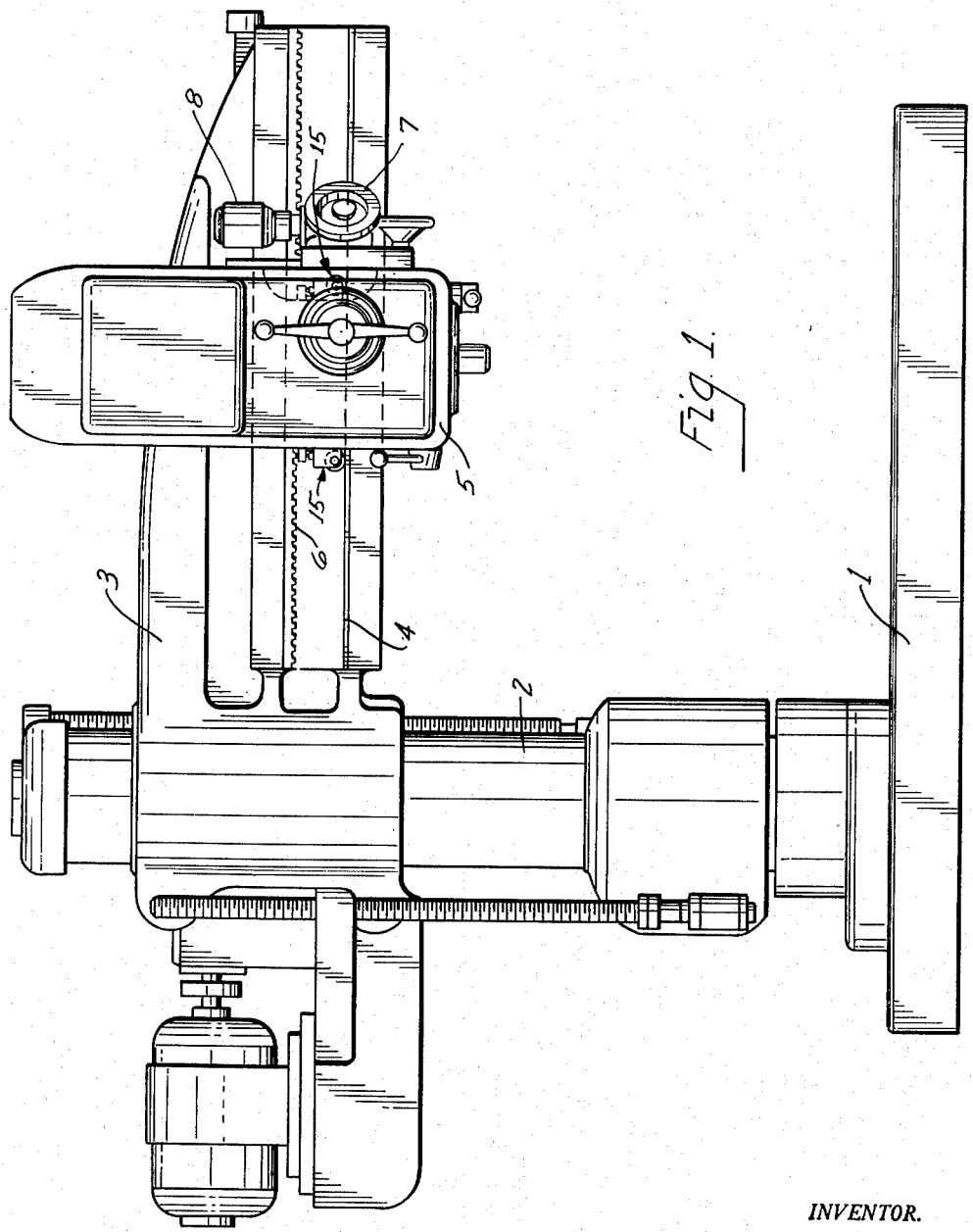
Fig. 1 is a front elevation of a radial drill press of the Carlton type.
Figure 2:
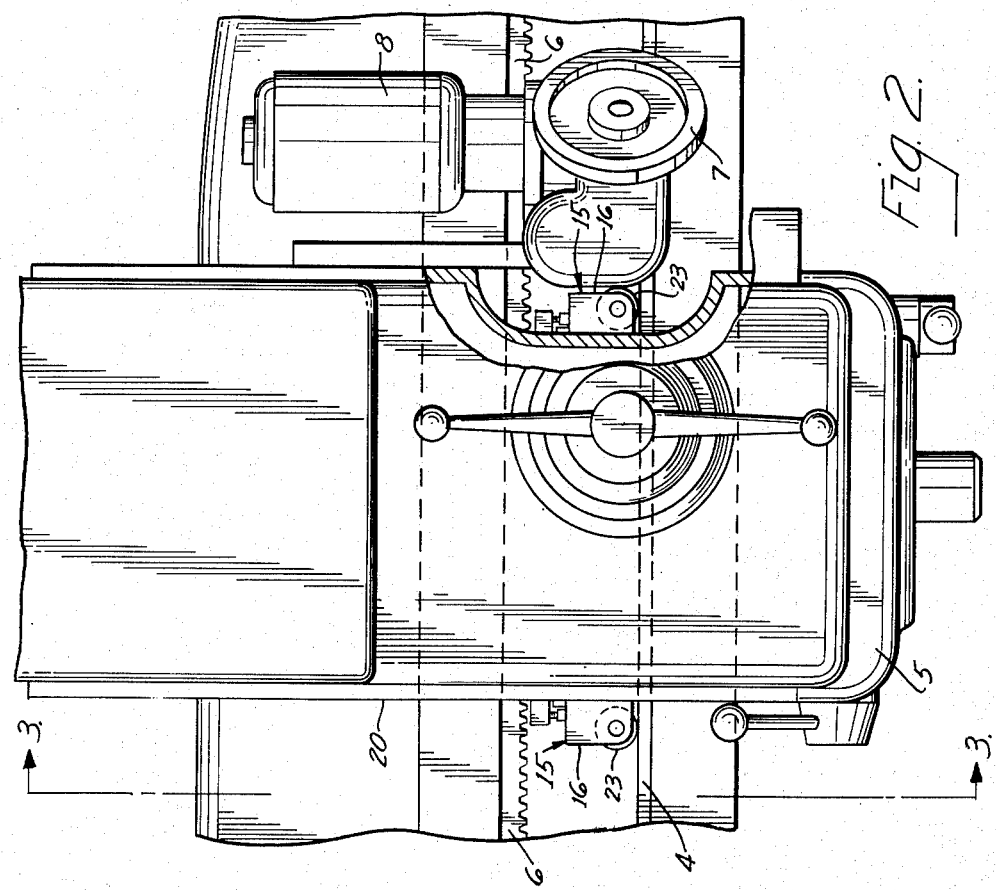
Fig. 2 is an enlarged fragmentary front elevation of a portion of the drill press illustrated in Fig. 1, showing the spindle carriage thereon, part of the carriage being shown in section for clearness in illustration.
Figure 4:
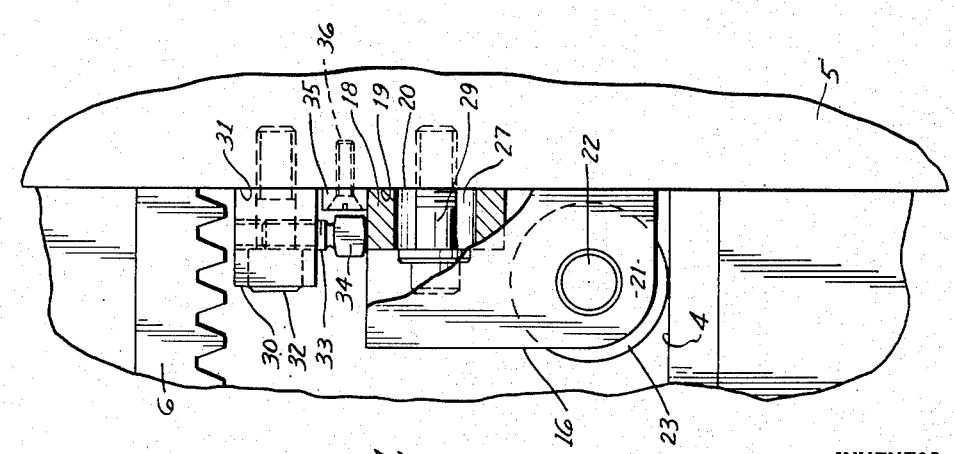
Fig. 4 is an enlarged fragmentary front elevation of a portion of the left end of the carriage illustrated in Fig. 2, showing, partially in section, one of the detachable antifriction devices of the present invention.

Referring to the drawings, the radial drill press of the Carlton type comprises generally a base 1 supporting an upright column or pedestal 2 on which a horizontally extending arm 3 is arranged for vertical adjustment. The arm 3 is provided with the usual gib-faced slideway 4 on which is slidably supported a spindle carriage member 5.

Generally these spindle carriages are very heavy as they include a change speed gear transmission for the spindle and for the traversing of the carriage member lengthwise of the arm. The carriage member 5 may be driven along the arm through the medium of a rack 6 secured on the arm and engaged by a suitable pinion, not shown, on the carriage member, the pinion in turn being driven through a suitable gear mechanism by means of hand wheel 7 or motor 8, selectively. For compensating for overbalance of the carriage member 5 rearwardly because of the heavy overhanging parts of the change speed transmission mechanism 9 of the spindle, the arm 3 is provided with an angularly disposed slideway 10 against which rides a slip shoe 11 fixedly secured on the bracket or extension 12 of the carriage member 5. Thus all of the weight is thrown onto the slideway 4.

As hereinbefore mentioned, in the larger machines of this type the carriage member with the heavy spindle, change speed gear transmission mechanism therefor, and other elements, carried thereon, imposes such a great weight on the slideway 4 that it is very difficult to slide the carriage member lengthwise of the arm against the frictional resistance created by the weight imposed on the slideway by the carrier member and its attached parts.

Newer machines of this type are provided with built-in antifriction devices which ride upon the guideway but many older machines are still in use in which the carriage member is slideably supported. Due to the structure of the older machines and the carriages thereof, very limited space is permitted, particularly at the outboard end of the carriage, for equipping it with any auxiliary type of device by which it can be antifrictionally supported on the original slideway and yet maintain its operating range.

In accordance with the present invention, a detachable antifriction device 15 is provided which can be secured to both the inboard and outboard ends of the carriage member, the inboard end being that end exposed toward the pedestal and the outboard end being that end exposed toward the free end of the arm.

In actual practice, two such devices 15 are used on each carriage member, as illustrated. Since the devices are identical in form and function, one only will be described in detail, that one being the one in the inboard end of the carriage member in Fig. 1.

Referring particularly to Figs. 2 through 5, the device 15 comprises a bracket member 16 which is detachably connected to the end of the carriage member 5 for vertical adjustment. On the bracket member 16 are mounted antifriction rollers, these rollers being positioned so as to engage and roll along the slideway 4 of the arm and support the carriage member 5 through the medium of the slideway so that it does not frictionally drag thereon.

In the form illustrated, the bracket 16 comprises a body 18 having a rear wall 19 which is adapted to be juxtaposed against the flat upright end wall 20 of the carriage member 5. Secured to the body 18 are two forwardly projecting laterally spaced side walls 21 by which a shaft 22 is supported. The shaft 22, in turn, supports antifriction rollers 23. Each antifriction roller is, in effect, a ball bearing assembly including an inner race 24 fitted onto the shaft 22, and outer race 25, and the usual set of balls 26 interposed therebetween in a conventional manner.

As mentioned, the bracket member 16 is connected to the carriage member for movement to different vertically adjusted positions. A convenient and economical manner of providing this mounting of the bracket comprises a passage 27 which extends forwardly and rearwardly through the body 18 and which is elongated vertically. A suitable bolt 29, having enlarged collar portion, extends through the passage 27 and is screw threaded into the end wall 20 of the carriage member 5. By slightly loosening the bolt 29, the bracket can be dropped downwardly until the rollers 23 rest under the weight of the bracket on the slideway 4, any slight deviation of the slideway from true horizontal position laterally of the arm being compensated for by a slight rocking of the bracket member 16 about the axis of the bolt.

When the bracket member 16 is thus positioned, the bolt 29 may be tightened slightly so as to hold the bracket in the position sufficiently tightly to prevent accidental displacement during final adjustment while permitting the bracket member to be moved vertically.

In addition to the bracket member 16, a second bracket member 30 is provided and is arranged to be detachably connected to the end wall 20 of the carriage member above the level of, and overhanging a portion of, the bracket member 16. For example, the bracket member 30 may be a simple piece of bar stock having a flat face 31 engaging the end face 20 of the carriage member. The bracket member 30 is secured in fixed position on the carriage member by a suitable means such as bolts 32.

Mounted in one of the bracket members which, in the illustrative example, is the bracket member 30, is a bolt 33 which is in screw threaded engagement with bracket member 30. The bolt is arranged with its axis vertical and is so positioned that it can engage at its end the bracket member 16. The bolt may extend entirely through the bracket member 30 but, since space is at a premium, it is preferable that it be somewhat shorter than the vertical dimension of the bracket member 30 and that it be disposed with its head downwardly and depending below the lower level of the bracket member 30 and with the bottom end of its head in engagement with an upwardly exposed surface of the bracket member 16. Thus, with the bracket member 16 held snugly but not too tightly in position with the bolt 29, the bolt 33 can be operated so as to exert downward force on the bracket member 16 and thereby force it downwardly so as to press the rollers firmly against the slideway 4 with sufficient pressure to lift the carriage member slightly therefrom, thus transferring the weight of the carriage from a sliding surface by which it was originally supported on the slideway to the antifriction rollers.

In machines of this character there is severe vibration and a problem very difficult of solution is to provide a compact device of this character which can be placed on the outside of the carriage member and adjusted readily and yet be held fixedly in adjusted position against the accidental loosening due to the heavy and frequent vibrational stresses.

In the present invention this is accomplished quite simply. The bolt 33 is arranged so that the laterally exposed wall portion of its head is next to the upright wall surface of one of the members, such as one of the bracket members or the carriage member. As shown, the head is close to the upright wall of the carriage member. The head of the bolt is polygonal and, in such an instance, the flattened wall portion of the head may be the flat side faces of the head. The bolt is positioned so that the head is relatively close to, but spaced from, the upright wall 20 of the carriage member. Accordingly, after the bolt 33 has been rotated to effect the proper adjusted position of the bracket 16, an elongated key 35 is interposed between the upright wall 20 of the carriage member and the adjacent flat side face of the head 34 of the bolt. This key fills the space between the flat side face of the bolt head and the upright wall of the member between which the side face of the key is interposed sufficiently so that the bolt cannot be rotated appreciably without its side face striking the key, and thus arresting the rotation of the bolt. The key in turn is securely fixed in its locking position by means of suitable screws 36 which extend through openings in the ends of the key and are in threaded engagement with the one of the members—in the form illustrated the carriage member—to which the key is to be connected.

The bolts 29, 32 and 33 are all readily accessible from the end of the carriage member without removal of any portion of the carriage member or its supporting parts. The bolt 34 can readily be manipulated by a small open end wrench while the weight of the carriage is transmitted thereto through the bracket member 16 and bracket member 30.

Accordingly, great precision is obtainable in the adjustment and the precise adjustment obtained is permanently held and need not be adjusted again throughout the life of the machine unless, of course, the gibs of the slideways are to be removed and replaced. The cooperating gibs of the carriage member which are normally provided for engagement with those of the slideways may be eliminated, as they no longer perform any useful function.

Having thus described my invention, I claim:

1. In a metal working machine including a generally horizontally extending arm, an upwardly facing slideway on, and extending endwise of, the arm, a tool carrying carriage member supported on the slideway and normally slidable therealong to different adjusted positions; a detachable antifriction support for the carriage member, said support comprising a bracket member, antifriction rollers carried thereby and arranged to roll along the slideway and antifrictionally support an end of the carriage when the bracket member is secured to, and in adjusted position vertically of, the carriage member, supporting means for detachably supporting said bracket member for adjustment vertically, a second bracket member, securing means for detachably securing the second bracket member to said end of the carriage member in a fixed position in which the second bracket member is spaced above and with a portion in alignment vertically with the first bracket member, a bolt in threaded engagement with one of the bracket members and in generally upright position and engaging the other of the bracket members so as to limit the movement of the bracket members relatively toward each other, said bolt having a head with a flat wall portion facing laterally of the head, a key interposable between said flat wall portion of said head and a wall of one of the members facing toward said flat wall portion of the head, and substantially filling the space between the wall and head and engaging said flat wall portion and thereby restraining the bolt from substantial rotation, and means to secure the key detachably to one of said members for retaining the key so interposed.

2. A metal working machine according to claim 1 characterized in that said first bracket member comprises a body having a flat upright outer rear wall juxtaposed against the end of the carriage member and having a passage therethrough extending from front to rear and elongated vertically, laterally spaced walls extend forwardly and rearwardly of the rear wall, said antifriction roller means are connected to said side walls, and said supporting means is a bolt extending through said passage and in threaded engagement with the carriage member.

3. A metal working machine according to claim 1 characterized in that said bolt is in threaded engagement with the second bracket member and depends therefrom and has the lower end of its head in engagement with the first bracket member.

4. A metal working machine according to claim 3 characterized in that said key is interposed between the said end wall of the carriage member and side of the head, and is secured detachably to said carriage.

5. A metal working machine according to claim 1 characterized in that the bolt head is polygonal and said wall portion is one side face of the head.

6. A metal working machine according to claim 1 characterized in that said bolt head is so arranged that said key can be slid endwise transversely of the bracket members into its operating position.

References Cited in the file of this patent
UNITED STATES PATENTS

| | | |
|---|---|---|
| 2,288,420 | Pegard | June 30, 1942 |
| 2,525,712 | Neighbour | Oct. 10, 1950 |
| 2,663,598 | Verderber | Dec. 22, 1953 |
| 2,722,162 | Berthiez | Nov. 1, 1955 |